United States Patent
Detterbeck et al.

(10) Patent No.: US 11,162,442 B2
(45) Date of Patent: Nov. 2, 2021

(54) DEVICE AND METHOD FOR DISCHARGING FUEL VAPOR FROM A FUEL SUPPLY SYSTEM FOR AN INTERNAL COMBUSTION ENGINE

(71) Applicant: Bayerische Motoren Werke Aktiengesellschaft, Munich (DE)

(72) Inventors: Stefan Detterbeck, Munich (DE); Tobias Holzinger, Munich (DE); Matthias Mersch, Huemmel (DE); Thomas Scheuer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/059,104

(22) PCT Filed: Jul. 11, 2019

(86) PCT No.: PCT/EP2019/068695
§ 371 (c)(1),
(2) Date: Nov. 25, 2020

(87) PCT Pub. No.: WO2020/025286
PCT Pub. Date: Feb. 6, 2020

(65) Prior Publication Data
US 2021/0222635 A1   Jul. 22, 2021

(30) Foreign Application Priority Data
Jul. 30, 2018   (DE) ..................... 10 2018 212 640.2

(51) Int. Cl.
*F02M 25/08*   (2006.01)
*F02D 41/00*   (2006.01)

(52) U.S. Cl.
CPC ....... *F02D 41/003* (2013.01); *F02M 25/0836* (2013.01); *F02M 25/0872* (2013.01)

(58) Field of Classification Search
CPC .. F02M 25/08; F02M 25/0836; F02M 25/089; F02M 25/0872; F02D 41/3863
(Continued)

(56) References Cited

U.S. PATENT DOCUMENTS 3,662,725 A   5/1972   Dragon et al.
3,996,951 A * 12/1976   Parr .......................... B08B 7/02
                                                       137/43

(Continued)

FOREIGN PATENT DOCUMENTS

DE   40 25 544 A1   10/1991
DE   40 30 948 C1   10/1991
(Continued)

OTHER PUBLICATIONS

International Search Report (PCT/ISA/210) issued in PCT Application No. PCT/EP2019/068695 dated Oct. 28, 2019 with English translation seven (7) pages.
(Continued)

*Primary Examiner* — Thomas N Moulis
(74) *Attorney, Agent, or Firm* — Crowell & Moring LLP

(57) ABSTRACT

A device for discharging fuel vapor from a fuel supply system for an internal combustion engine has a container which is situated in the fuel supply system and contains liquid fuel under an upwardly limited pressure. A discharge line, which leads to a tank venting system, leads out of the container. The device also has a detector for detecting vaporous fuel in the container and a blocking device which is coupled to the detector and with which the discharge line can be opened or blocked depending on the detection. A method for discharging fuel vapor from a fuel supply system for an internal combustion engine continuously detects whether vaporous fuel is also present in the container which is situated in the fuel supply system and contains the liquid
(Continued)

fuel under an upwardly limited pressure; opens the discharge line if the vaporous fuel has been detected and blocks the discharge line if no vaporous fuel has been detected; and discharges the vaporous fuel through the opened discharge line while retaining the liquid fuel.

20 Claims, 2 Drawing Sheets

(58) Field of Classification Search
USPC .......................................................... 123/516
See application file for complete search history.

(56) References Cited

U.S. PATENT DOCUMENTS

| | | | | |
|---|---|---|---|---|
| 4,300,509 A * | 11/1981 | Schechter | .................. | F02D 1/12 123/456 |
| 4,450,820 A * | 5/1984 | Haynes | .................. | F02D 33/006 123/514 |
| 4,602,605 A * | 7/1986 | Adkins | .................. | F02D 33/003 123/516 |
| 4,625,701 A * | 12/1986 | Bartlett | .............. | F02M 37/0052 123/514 |
| 4,732,131 A * | 3/1988 | Hensel | ................... | F02M 37/20 123/456 |
| 4,856,483 A * | 8/1989 | Beavis | .................. | F02B 61/045 123/516 |
| 4,926,829 A * | 5/1990 | Tuckey | .................. | F02D 33/003 123/41.31 |
| 5,019,141 A * | 5/1991 | Granville | ........... | B01D 19/0063 137/202 |
| 5,119,790 A * | 6/1992 | Olson | ................. | F02M 37/0023 123/510 |
| 5,137,002 A * | 8/1992 | Mahoney | ............... | F02M 25/08 123/179.9 |
| 5,186,153 A | 2/1993 | Steinbrenner et al. | | |
| 5,263,459 A * | 11/1993 | Talaski | ................. | F02M 37/103 123/516 |
| 5,269,276 A * | 12/1993 | Brown | ............... | F02M 37/0052 123/514 |
| 5,372,116 A * | 12/1994 | Davis | ................. | F02M 37/0041 123/447 |
| 5,390,651 A * | 2/1995 | Nussbaum | ............ | F02D 19/023 123/694 |
| 5,426,971 A * | 6/1995 | Glidewell | ............. | F02M 37/20 123/516 |
| 5,579,740 A * | 12/1996 | Cotton | ............... | F02M 25/0854 123/514 |
| 5,590,697 A | 1/1997 | Benjey et al. | | |
| 5,730,106 A * | 3/1998 | Gonzalez | ........... | F02M 37/0047 123/516 |
| 6,138,707 A * | 10/2000 | Stuart | .................... | B67D 7/002 137/202 |
| 6,158,456 A * | 12/2000 | Enge | ................ | B60K 15/03519 137/202 |
| 6,289,879 B1 * | 9/2001 | Clausen | ............. | F02M 37/0052 123/516 |
| 6,439,258 B1 | 8/2002 | Decapua | | |
| 6,527,947 B1 * | 3/2003 | Channing | .......... | F02M 37/0029 210/136 |
| 6,553,974 B1 * | 4/2003 | Wickman | ............... | F02M 37/20 123/516 |
| 6,622,709 B2 * | 9/2003 | Miller | .................... | F02M 37/44 123/516 |
| 6,694,955 B1 * | 2/2004 | Griffiths | ............... | F02M 25/089 123/509 |
| 6,874,482 B2 * | 4/2005 | Lahner | .................. | F02M 17/04 123/179.9 |
| 6,918,380 B2 * | 7/2005 | Nomura | ................ | F02M 37/10 123/495 |
| 7,185,639 B1 * | 3/2007 | Roche | ................ | F02M 25/0836 123/198 DB |
| 7,503,314 B2 * | 3/2009 | Achor | .................... | F02M 37/20 123/497 |
| 7,713,335 B2 * | 5/2010 | Ringenberger | ........ | B01D 19/00 95/261 |
| 7,779,818 B2 * | 8/2010 | Wilson | ............... | F02M 37/0047 123/514 |
| 7,931,011 B2 * | 4/2011 | Lee | ..................... | F02M 37/0023 123/514 |
| 8,196,567 B2 * | 6/2012 | Pursifull | ............. | F02D 19/0694 123/495 |
| 8,371,271 B2 * | 2/2013 | Achor | .................... | F16K 1/308 123/516 |
| 8,448,629 B2 | 5/2013 | Makino et al. | | |
| 8,602,003 B2 * | 12/2013 | Schoenfuss | ........ | F02M 25/0818 123/516 |
| 10,704,478 B1 * | 7/2020 | Dudar | ................ | F02M 25/0827 |
| 2002/0083923 A1 * | 7/2002 | Suzuki | .................. | F02B 61/045 123/464 |
| 2002/0189589 A1 * | 12/2002 | Kato | .................... | F02M 63/0225 123/458 |
| 2004/0123846 A1 * | 7/2004 | Rado | ...................... | F02M 17/34 123/525 |
| 2004/0200460 A1 * | 10/2004 | Mitani | ............... | F02M 25/0818 123/520 |
| 2004/0237943 A1 * | 12/2004 | Krishnamoorthy | .... | F02M 59/44 123/516 |
| 2004/0261769 A1 * | 12/2004 | Kuroda | .............. | F02M 63/0225 123/458 |
| 2005/0087227 A1 * | 4/2005 | Powell | .................. | F16K 24/044 137/202 |
| 2005/0178368 A1 * | 8/2005 | Donahue | ................ | F02M 25/08 123/520 |
| 2005/0274364 A1 * | 12/2005 | Kirk | ................... | F02M 25/0854 123/519 |
| 2007/0169842 A1 * | 7/2007 | King | ................ | B60K 15/03504 141/302 |
| 2008/0053413 A1 * | 3/2008 | Donahue | ............ | F02M 25/0872 123/510 |
| 2008/0230038 A1 * | 9/2008 | Giacomazzi | ......... | F02M 25/089 123/519 |
| 2011/0251776 A1 * | 10/2011 | Bartell | ................. | F02M 69/045 701/103 |
| 2014/0230920 A1 | 8/2014 | Shimokawa et al. | | |
| 2017/0198671 A1 * | 7/2017 | Dudar | .............. | F02M 35/10019 |
| 2018/0209359 A1 * | 7/2018 | Dudar | ................... | F02D 41/004 |
| 2019/0101072 A1 * | 4/2019 | Dudar | ................. | F02D 41/0035 |
| 2020/0309075 A1 * | 10/2020 | Carrillo | ................ | F02M 37/106 |

FOREIGN PATENT DOCUMENTS

| | | |
|---|---|---|
| DE | 695 25 070 T2 | 9/2002 |
| DE | 102 57 223 A1 | 6/2004 |
| DE | 600 31 768 T2 | 9/2007 |
| DE | 10 2008 004 696 A1 | 7/2008 |
| DE | 10 2008 014 614 A1 | 11/2008 |
| DE | 10 2013 221 797 A1 | 4/2015 |
| DE | 10 2015 216 504 A1 | 3/2017 |

OTHER PUBLICATIONS

German-language Written Opinion (PCT/ISA/237) issued in PCT Application No. PCT/EP2019/068695 dated Oct. 28, 2019 (six (6) pages).
German-language Search Report issued in German Application No. 10 2018 212 640.2 dated Apr. 8, 2019 with partial English translation (13 pages).

* cited by examiner

DEVICE AND METHOD FOR DISCHARGING FUEL VAPOR FROM A FUEL SUPPLY SYSTEM FOR AN INTERNAL COMBUSTION ENGINE

BACKGROUND AND SUMMARY OF THE INVENTION

The invention relates to a device and a method for discharging fuel vapor from a fuel supply system for an internal combustion engine.

In internal combustion engines, in which a high-pressure pump conveys the fuel to the injection nozzles (injectors), vapor bubbles may form in the high-pressure pump. These vapor bubbles can impair the warm start-up capability of the vehicle, that is to say, the start-up of the engine after switching off in the hot state may be delayed.

In order to ensure an immediate warm start-up capability of the engine according to current findings, therefore, the vapor bubble formation has to be completely prevented. To this end, methods are known in which the maximum temperature which is achieved in the respective operating state in the high-pressure pump is predicted using a model. If this temperature exceeds a critical value from which vapor bubbles can form, active cooling measures are taken, such as the reduction of the cooling water desired temperature and the operation of an electrical engine fan. In addition, the pre-feed pressure at which the fuel is supplied to the high-pressure pump can be increased in order to limit the range of the vapor bubble formation. However, these counter-measures are relevant to the fuel consumption and consequently also to the $CO_2$ emission. Furthermore, at least some of the counter-measures impair comfort. In particular, the continued running of the electrical engine fan when the engine has been switched off is perceived to be unpleasant by many vehicle users.

An object of the invention is to avoid the above-mentioned disadvantages and to improve the warm start capability of an internal combustion engine.

This object is achieved by a device and by a method according to the independent claims. Advantageous and favorable embodiments of the device according to the invention and the method according to the invention are set out in the associated dependent claims.

The device according to the invention for discharging fuel vapor from a fuel supply system for an internal combustion engine comprises a container which is arranged in the fuel supply system and in which liquid fuel under an upwardly limited pressure is located, and a discharge line which leads out of the container. The device according to the invention further comprises a detector for detecting vaporous fuel in the container and a blocking device which is coupled to the detector and by which the discharge line can be released or blocked depending on the detection.

The mentioned container of the device according to the invention, naturally with the exception of the discharge line, is not hermetically sealed, but instead integrated in the flow path of the fuel supply and can accordingly also be a specific portion of a fuel line or the like.

The invention is based on the recognition that it is possible to dispense with the counter-measures described in the introduction, by means of which the formation of vapor bubbles in the high-pressure pump of the fuel supply system is intended to be prevented, if the fuel vapor which is produced can be successfully discharged from the fuel supply system.

The device according to the invention makes this possible as a result of an intelligent and automatic ventilation in which only the vaporous fuel is discharged, whilst the liquid fuel is held back and remains in the fuel supply system.

The discharge line of the device according to the invention preferably leads to a tank ventilation system, where the vaporous fuel accumulates and can be supplied for combustion the next time the internal combustion engine is started.

In order to ensure that, even in the event of a failure of the device according to the invention, no liquid fuel can escape from the fuel supply system, the blocking device is preferably configured in such a manner that it keeps the discharge line closed in principle and releases the discharge line only when vaporous fuel is detected in the container.

The detector of the device according to the invention may be a suitably fitted gas sensor.

With regard to a compact design and easy assembly, embodiments of the device according to the invention are preferred in which the detector forms a structural unit with the blocking device.

In specific embodiments, the detector and the blocking device may even be constructed as a single component.

However, the blocking device for releasing and blocking the discharge line may also comprise a controllable valve, in particular a blocking valve.

The coupling of the blocking device to the detector is either electrical or mechanical, depending on whether the blocking device can be controlled electrically or mechanically.

A simple embodiment of the device according to the invention is achieved by the discharge line leading out of the container at the top with respect to the installation position. Since the vaporous fuel has a lower density than the liquid fuel and accordingly rises upward in the container, the vaporous portion of the fuel can be readily discharged in an upward direction, whilst the liquid portion remains in the container.

According to a preferred, purely mechanical embodiment of the invention, the blocking device and the detector are formed by means of a float in the container, the density of the float being less than that of the liquid fuel and greater than that of the vaporous fuel. The float acts in this instance as an independent control element. When the container is completely filled with liquid fuel, it is automatically pushed upward, whereas in the event of the formation of bubbles (vaporous fuel) it sinks downward with the subsequently falling liquid level. This behavior of the float can be used for the desired blocking and release of the discharge line.

In a preferred embodiment of the device according to the invention, the shape of the float is adapted to the shape of a transition region between the upper end of the container and the discharge line in such a manner that, when the float is pressed onto the transition region, the discharge line is sealed. Other than the float, no additional component for the two functions (i) detection of fuel vapor and (ii) release/blocking of the discharge line is then required.

A good sealing is achieved, for example, with a substantially spherical float which is adapted to a conically tapering transition region.

In particular, the transition region may be substantially in the form of a hollow truncated cone, wherein the angle between the covering face and the center axis of the truncated cone is less than 90° and preferably approximately 88° in order to enable lowering of the float as a result of the gravitational force thereof with respect to the buoyancy forces which act in a closing manner and the pressing forces which act in a closing manner as a result of the pressure in the container. Since the pressure in the container with a closed blocking device is normally greater than the pressure in the discharge line, the resulting pressure forces also act in a closing manner on the float.

For safety reasons, a non-return valve can be fitted in the discharge line and configured in such a manner that the pressure in the discharge line upstream in the throughflow direction of the non-return valve cannot press on the float.

The invention also provides for a method for discharging fuel vapor from a fuel supply system for an internal combustion engine. The method according to the invention comprises the following steps: continuously detecting whether vaporous fuel is also present in a container which is arranged in the fuel supply system and in which liquid fuel under an upwardly limited pressure is located; releasing a discharge line when vaporous fuel has been detected and blocking the discharge line when no vaporous fuel has been detected; and discharging vaporous fuel through the released discharge line whilst liquid fuel is retained.

In order to carry out the method according to the invention, a device of the above-described type is preferably provided.

As already mentioned, the vaporous fuel is preferably discharged to a tank ventilation system, where it accumulates and is supplied to the internal combustion engine for combustion.

Other features and advantages of the invention will be appreciated from the following description and from the appended drawings, to which reference is made.

DETAILED DESCRIPTION OF THE DRAWINGS

Figure 1:
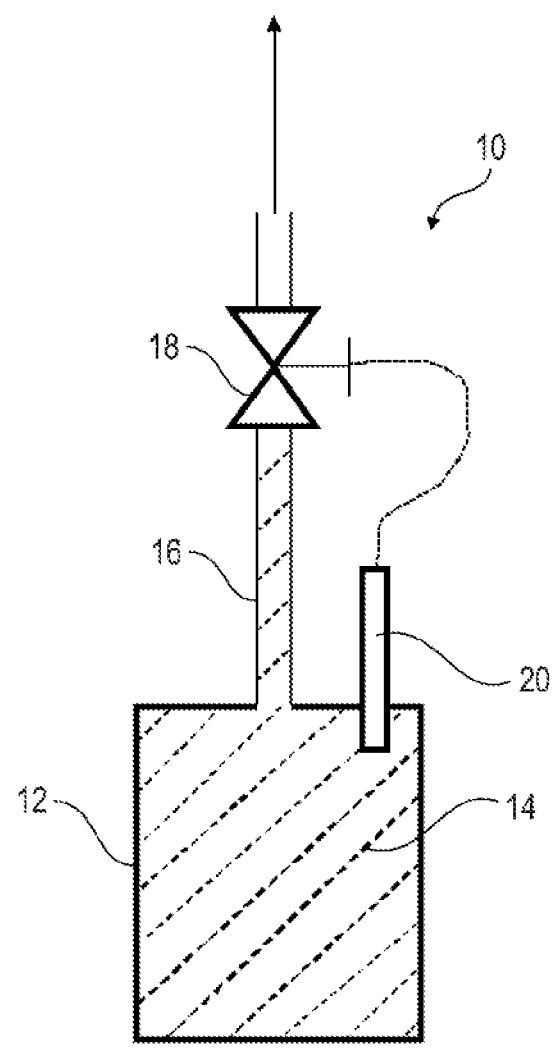
FIG. 1 is a schematic illustration of an exemplary device according to the invention for discharging fuel vapor from a fuel supply system.

FIG. 1 shows the basic functional structure of a device 10 for discharging fuel vapor from a fuel supply system for an internal combustion engine of a motor vehicle. At a suitable location in the fuel supply system, in particular in or upstream of a high-pressure pump, a discharge line 16 leads out of a container 12 in which liquid fuel 14 under an upwardly limited pressure (in the order of magnitude of approximately 6 bar (relative)) is located. The discharge line 16 leads to a tank ventilation system by means of which a fuel container, in particular the tank of the motor vehicle, can be aerated and ventilated.

The discharge line 16 can be automatically released or blocked. To this end, a valve device having a blocking device 18 and a detector 20 which is coupled thereto is provided. The detector 20 is capable of recognizing whether—apart from the liquid fuel 14—vaporous fuel is also located in the container 12. The blocking device 18 keeps the discharge line 16 closed in principle. However, as soon as the detector 20 identifies the presence of fuel vapor in the container 12, the detector 20 controls the blocking device 18 in such a manner that it releases the discharge line 16. In this instance, the fuel vapor escapes via the discharge line 16 to the tank ventilation system. To this end, the discharge line 16 must be configured in such a manner that the fuel vapor which is produced preferably accumulates in the discharge line 16. For example, the discharge line 16 may be arranged geodetically higher than the container 12.

If no further fuel vapor is identified by the detector 20, the blocking device 18 closes the discharge line 16 again so that ideally no liquid fuel 14 reaches the discharge line 16.

The fuel vapor which has escaped via the discharge line 16 is accumulated in the tank ventilation system and then supplied to the internal combustion engine for combustion at the next start-up.

The detector 20 may be an independent sensor or may form a structural unit together with the blocking device 18. The detector 20 and the blocking device 18 may also be constructed as a single component, as in the embodiment which is described below and which is shown in FIGS. 2 and 3.

The blocking device 18 may comprise a valve, in particular a blocking valve. The coupling between the detector 20 and the blocking device 18 may in particular be configured in an electrical or purely mechanical manner. In the first instance, the blocking device 18 is preferably an electrically controllable blocking valve.

Ultimately, the device 10 enables fuel vapor to be discharged from the fuel supply system to the tank ventilation system, with liquid fuel 14 being retained.

Figures 2, 3:
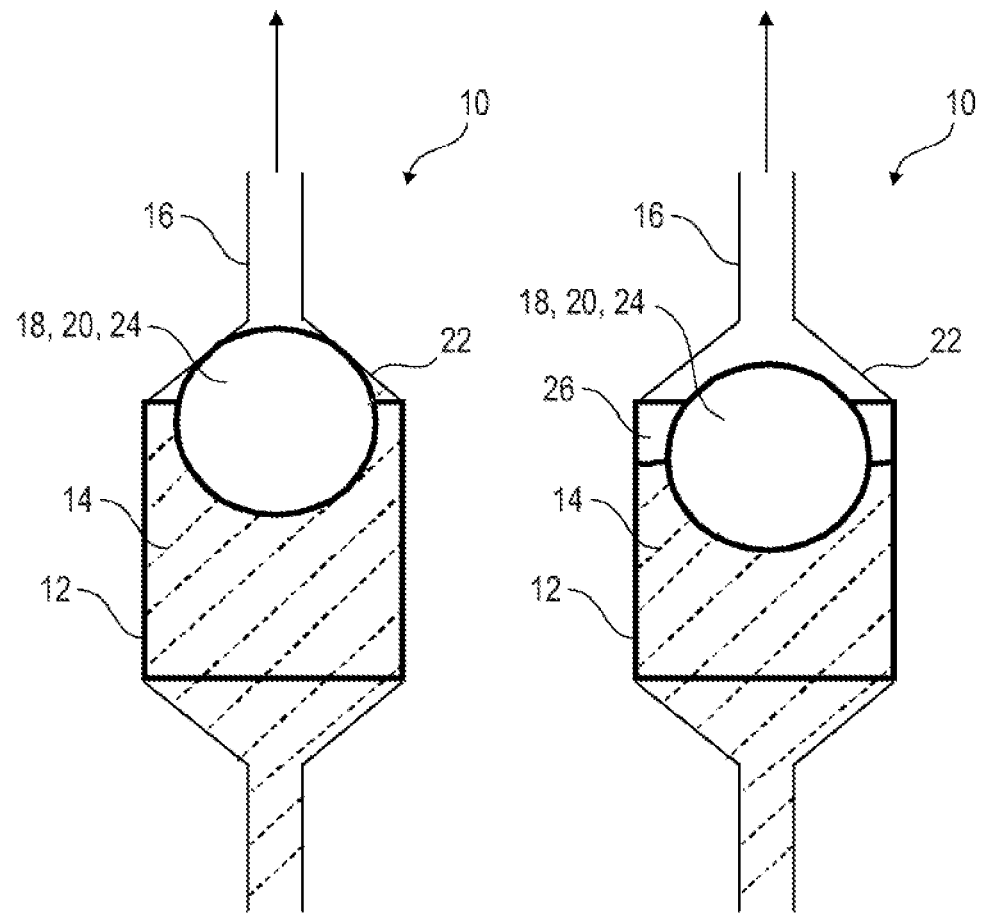
FIG. 2 is a schematic sectioned view of a mechanical embodiment of the device according to the invention in a first operating state.
FIG. 3 shows the device from FIG. 2 in a second operating state.

FIGS. 2 and 3 illustrate a particularly simple, purely mechanical embodiment of the device 10 for discharging fuel vapor from the fuel supply system. With respect to the installation position, the discharge line 16 is guided upward out of the container 12. The transition region 22 between the upper end of the container 12 and the discharge line 16 is substantially in the form of a hollow truncated cone.

Inside the container 12 there is a float 24, the density of which is lower than that of the liquid fuel 14. For the float 24, for example, a material having a density of 650 kg/m$^3$ or lower can be selected since the density of commercially available fuels is greater than this value.

The shape of the float 24 is adapted to the shape of the transition region 22 between the upper end of the container 12 and the discharge line 16 in such a manner that the float 24, when it is pressed upward, ideally completely seals the discharge line 16.

In the embodiment illustrated, the angle between the covering face and the center axis of the truncated cone is approximately 30°. The float 24 is a sphere whose diameter is selected in such a manner that there is a circumferential contact with the inner side of the transition region 22 when the float 24 is pressed upward.

The operating method of this embodiment is explained below. If in the fuel supply system, more specifically in the container 12, only liquid fuel 14 and no fuel vapor is present, the liquid fuel 14 which is under an upwardly limited pressure presses the float 24 upward against the inner wall of the conical transition region 22 and seals it. This situation is illustrated in FIG. 2. In this state, the discharge line 16 is blocked so that no liquid fuel 14 can escape from the fuel supply system.

If fuel vapor 26 is located in the container 12, however, it rises upward as a result of its substantially lower density so that the liquid level drops, as shown in FIG. 3. The float 24 then also sinks downward and is no longer pressed against the inner wall of the conical transition region 22. The discharge line 16 is consequently no longer sealed and the fuel vapor 26 can escape into the discharge line 16 and be discharged into the tank ventilation system.

When the fuel vapor 26 escapes, the liquid level in the container 12 rises again until the fuel vapor 26 is completely discharged and the liquid fuel 14 presses the float 24 upward again so that the discharge line 16 is sealed again and consequently blocked.

With regard to the general schematic depiction of FIG. 1, in the embodiment shown in FIGS. 2 and 3 the float 24 constitutes the detector 20 and at the same time also the blocking device 18. The float 24 therefore performs a dual function in this instance.

In order to prevent the pressure in the discharge line 16 from being able to press on the float 24, there may be fitted in the discharge line 16 a correspondingly configured non-return valve, which accordingly limits the pressure in the discharge line 16 in an upstream direction in the throughflow direction of the non-return valve.

In order to remove the fuel vapor 26 from the fuel supply system as effectively as possible, the container 12, more specifically the upper end thereof, is intended to be arranged at an upper, ideally at the geodetically highest, location of the high-pressure pump or the fuel supply system.

LIST OF REFERENCE NUMERALS

10 Discharge device
12 Container
14 Liquid fuel
16 Discharge line
18 Blocking device
20 Detector
22 Transition region
24 Float
26 Fuel vapor

What is claimed is:

1. A device for discharging fuel vapor from a fuel supply system for an internal combustion engine, comprising:
   a container which is arranged in the fuel supply system and in which liquid fuel under an upwardly limited pressure is located;
   a discharge line which leads out of the container;
   a detector for detecting vaporous fuel in the container; and
   a blocking device which is coupled to the detector and by which the discharge line is released or blocked depending on the detection, wherein
      the discharge line leads out of the container at a top with respect to an installation position.
2. The device according to claim 1, wherein the discharge line leads to a tank ventilation system.
3. The device according to claim 1, wherein the blocking device is configured to keep the discharge line closed and releases the discharge line only when vaporous fuel is detected in the container.
4. The device according to claim 1, wherein the detector is a gas sensor.
5. The device according to claim 1, wherein the detector forms a structural unit with the blocking device.
6. The device according to claim 1, wherein the detector and the blocking device are constructed as a single component.
7. The device according to claim 1, wherein the blocking device comprises a controllable valve.
8. The device according to claim 7, wherein the controllable valve is a blocking valve.
9. The device according to claim 1, wherein the blocking device is electrically coupled to the detector.
10. The device according to claim 1, wherein the blocking device is mechanically coupled to the detector.
11. The device according to claim 1, wherein the blocking device and the detector are formed by a float in the container, a density of the float being less than that of the liquid fuel and greater than that of the vaporous fuel.
12. The device according to claim 11, wherein a shape of the float is adapted to a shape of a transition region between an upper end of the container and the discharge line such that, when the float is pressed onto the transition region, the discharge line is sealed.
13. The device according to claim 12, wherein the float is substantially spherical and the transition region tapers conically.
14. The device according to claim 13, wherein the transition region is substantially in the form of a hollow truncated cone and an angle between a covering face and a center axis of the truncated cone is in a range below 90°.
15. The device according to claim 13, wherein the angle is approximately 88°.
16. The device according to claim 12, further comprising: a non-return valve fitted in the discharge line and configured such that the pressure in the discharge line upstream in a throughflow direction of the non-return valve cannot press on the float.
17. A method for discharging fuel vapor from a fuel supply system, comprising:
   continuously detecting whether vaporous fuel is present in a container which is arranged in the fuel supply system and in which liquid fuel under an upwardly limited pressure is located;
   releasing a discharge line when vaporous fuel has been detected and blocking the discharge line when no vaporous fuel has been detected; and
   discharging vaporous fuel through the released discharge line whilst liquid fuel is retained, wherein
      the discharge line leads out of the container at a top with respect to an installation position.
18. The method according to claim 17, wherein the vaporous fuel is discharged to a tank ventilation system where the vaporous fuel accumulates and is supplied to an internal combustion engine for combustion.
19. The method according to claim 17, wherein the blocking and the detecting are performed by a float in the container, a density of the float being less than that of the liquid fuel and greater than that of the vaporous fuel.
20. The method according to claim 19, wherein a shape of the float is adapted to a shape of a transition region between an upper end of the container and the discharge line such that, when the float is pressed onto the transition region, the discharge line is sealed.

* * * * *